United States Patent [19]

Sugiyama

[11] Patent Number: 4,672,472
[45] Date of Patent: Jun. 9, 1987

[54] PLAYBACK APPARATUS FOR AUDIOVISUAL DISC RECORDS

[75] Inventor: Hiroyuki Sugiyama, Isehara, Japan

[73] Assignee: Victor Company of Japan, Ltd., Yokohama, Japan

[21] Appl. No.: 701,332

[22] Filed: Feb. 13, 1985

[30] Foreign Application Priority Data

Feb. 13, 1984 [JP] Japan ................................. 59-24770
Feb. 13, 1984 [JP] Japan ................................. 59-24772

[51] Int. Cl.⁴ .............................................. G11B 7/00
[52] U.S. Cl. ..................................... 358/341; 358/342
[58] Field of Search ....................... 358/341, 342, 343; 360/19.1, 35.1; 369/109

[56] References Cited

U.S. PATENT DOCUMENTS

| | | | |
|---|---|---|---|
| 4,317,131 | 2/1982 | Jerome | 358/342 |
| 4,347,527 | 8/1982 | Lainez . | |
| 4,353,090 | 10/1982 | Broadbent | 358/342 |
| 4,446,488 | 5/1984 | Suzuki . | |
| 4,488,182 | 12/1984 | Takahashi et al. | 358/342 X |
| 4,490,752 | 12/1984 | Machida et al. | 358/342 |

FOREIGN PATENT DOCUMENTS 2901034 11/1980 Fed. Rep. of Germany .
3043253 5/1981 Fed. Rep. of Germany .
3232872 4/1983 Fed. Rep. of Germany .

*Primary Examiner*—Robert L. Richardson
*Attorney, Agent, or Firm*—Pollock, VandeSande & Priddy

[57] ABSTRACT

In a playback apparatus a first sync code is detected from a series of data blocks to separate binary digits of multi-channel still-picture data from binary digits of multi-channel audio and computer-control data. Second and third sync codes are subsequently detected from the separated binary digits of the audio and computer-control data. A data selector is responsive to a channel selection manual command signal and to the second sync code for selecting the audio data words of a desired channel and the computer-control data bits of a desired channel from the separated binary digits of the multi-channel audio and computer-control data. A video converter is responsive to the command signal for storing the still-picture data words of a desired channel for a predetermined period and converting the stored data words into an analog video signal for application to a visual display. An audio converter converts the selected audio data words into an analog audio signal for application to a loudspeaker. A decoder is provided to respond to the detected third sync code by decoding the computer-control binary digits of the selected channel into computer-control data words for application to a personal computer which is coupled to the display.

4 Claims, 15 Drawing Figures

PLAYBACK APPARATUS FOR AUDIOVISUAL DISC RECORDS

RELATED APPLICATION

The present invention is related to our Copending U.S. patent applications Ser. No. 609,193 filed May 11, 1984, titled "Rotary Recording Medium", invented by H. Sugiyama et al. and Ser. No. 609,237 filed May 11, 1984, titled "Rotary Recording Medium Reproducing Apparatus", invented by H. Sugiyama et al, both applications being assigned to the same assignee as the present application.

BACKGROUND OF THE INVENTION

The present invention relates to a playback apparatus for disc records, and more particularly to a playback apparatus for audiovisual disc records in which a series of still-picture digital video data and audio digital data is recorded in tracks.

The recent introduction of video discs and digital audio discs and the increasing use of personal computers have created a demand for audiovisual systems that combine the audio and visual features with the versatile capabilities of computers.

SUMMARY OF THE INVENTION

An object of the present invention is to provide a playback apparatus for disc records which store audio-visual information.

The playback apparatus of the invention is adapted to reproduce disc records of the type in which information is recorded as microscopic pits in radially spaced apart track turns, the information being a sequence of data blocks of multiplexed data words of multi-channel still-picture video signals, data words of multi-channel audio signals and data bits of multi-channel computer-control signals, the audio data words and the computer-control data bits being organized into a sequence of sub-blocks, the volume of information contained in the computer-control data bits of each of the sub-blocks being much smaller than the volume of information contained in the audio data words of each of the sub-blocks, the information further including a first sync code for identifying each data block, a second sync code identifying each sub-block and a third sync code identifying a sequence of the sub-blocks.

The apparatus comprises means for detecting the recorded information from the disc record to recover the sequence of data blocks. The first sync code is detected from the recovered data blocks to separate binary digits of still-picture data of each channel from binary digits of the audio and computer-control data of each channel, and the second and third sync codes are subsequently detected from the separated binary digits of the audio and computer-control data. A data selector is responsive to a channel selection signal supplied from a keyboard and to the detected second sync code for selecting the audio data words of a desired channel and the computer-control data bits of a desired channel from the separated binary digits of the audio and computer-control data of said channels. A video converting means, or decoder is responsive to the selection signal for storing the still-picture data words of a desired channel for a predetermined period and converting the stored data words into an analog video signal for application to a visual display. An audio converter converts the selected audio data words into an analog audio signal for application to a loudspeaker. A decoder is provided to respond to the detected third sync code by decoding the computer-control binary digits of the selected channel into computer-control data words for application to a personal computer which is coupled to the display.

BRIEF DESCRIPTION OF THE DRAWINGS

The present invention will be described in further detail with reference to the accompanying drawings, in which:

FIG. 8 is an illustration of a disc record;

DETAILED DESCRIPTION

Figure 1:
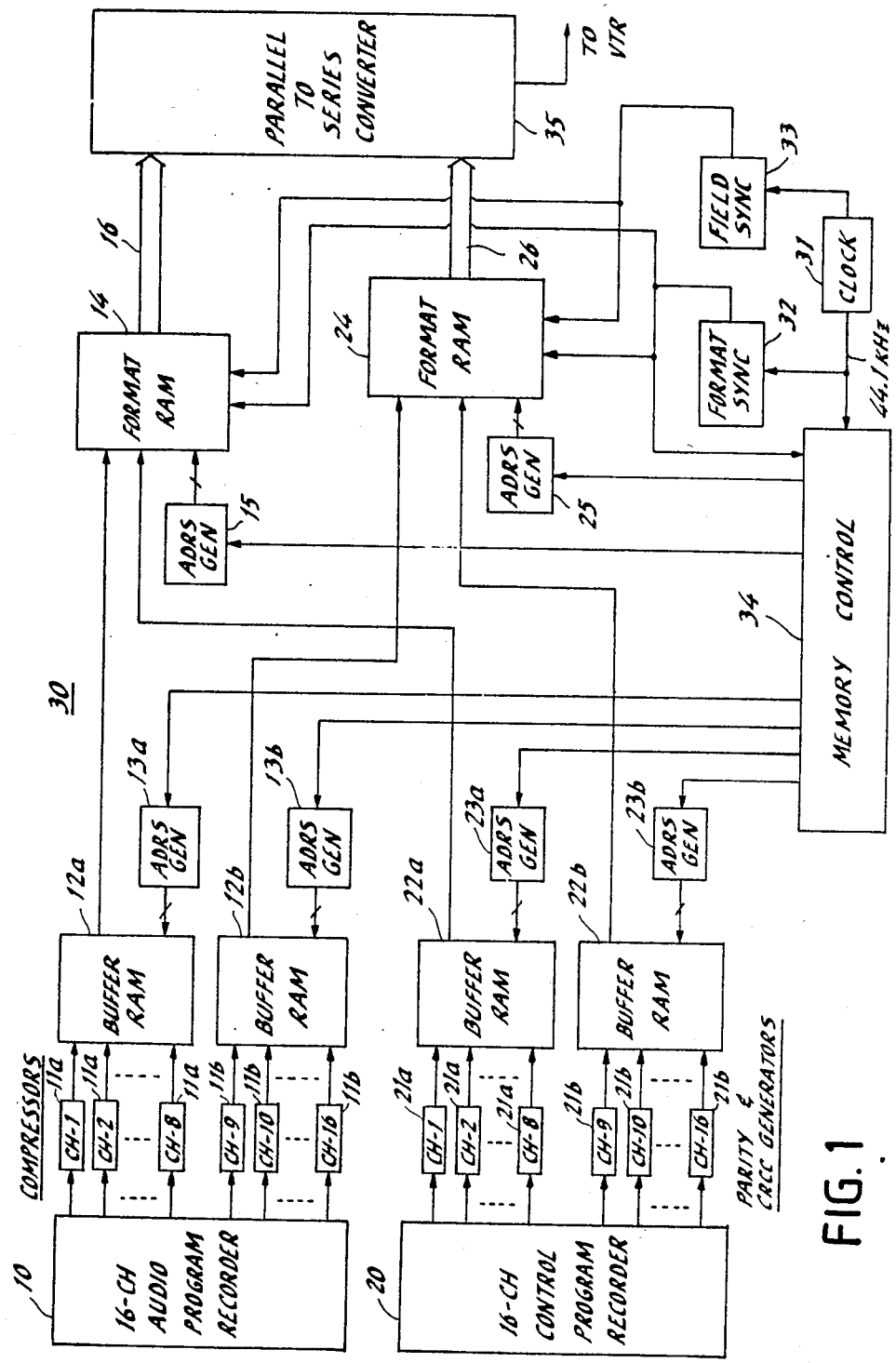
FIG. 1 is a block diagram of an audio section of the recording apparatus of the invention.

Referring now to FIG. 1, there is schematically shown an audio section of a recording apparatus according to the present invention. An audio program recorder 10 contains sixteen-channel program sources of audio information such as narrations and sound effects to be presented simultaneously with a corresponding prerecorded still-picture program. The volume of information contained in each still-picture program is much smaller than the volume of information contained in the normal (moving-picture) video program. As long as the amount of information permits, the still-picture data may contain an animated picture which is to be displayed in a window within the field of a still picture. Each audio program is a digital record of 44.1-kHz samples of 16-bit word of audio-band signals on magnetic tape using current digital techniques for high quality music recordings. The narration programs are provided in two language versions. Although sound effects of corresponding programs may be independent of languages, the sixteen audio program sources are divided into two language versions of 8 channels each to permit users to select a desired language program. The digital audio programs of each language version are reduced to 8-bit word by data compressors 11a and 11b. and 11b.

Clock pulses at a frequency of 44.1 kHz are generated by a clock source 31 and supplied to address generators 13a, 13b, 23a, 23b, 15, 25 to sequentially increment their address counts.

Eight-bit digital audio data fed to a first buffer RAM 12a are sequentially stored in specified locations in response to address codes provided by an address generator 13a. Likewise, data fed to a second buffer RAM 12b are sequentially stored in specified locations in response to address codes from address generator 13b.

A computer-control data recorder 20 contains sixteen-channel prerecorded computer-control data sources such as graphic symbols and characters to be superimposed on the still picture and musical notes to be fed to a personal computer for automatic music play. The computer-control data sources are likewise divided into two language versions of 8 channels each corresponding to the audio program recorder 10.

Digital control data outputs on No. 1 to No. 8 channels of the first language version are applied from recorder 20 respectively to parity-CRC (cyclic redundancy check) code generators 21a and fed to a third buffer RAM 22a of a data formatting circuit 30 and sequentially stored in locations by an address generator 23a. Control data outputs on No. 9 to No. 16 channels of the second language version are applied respectively to parity-CRC (cyclic redundancy check) code generators 21b and fed to a fourth buffer RAM 22b and sequentially stored in locations by an address generator 23b.

The output terminals of the first and second buffer RAMs 12a and 12b are connected to first and second formatting RAMs 14 and 24, respectively, and the output terminals of the third and fourth buffer RAMs 22a and 22b are connected respectively to the first and second formatting RAMs 14, 24. Digital data stored in buffer RAMs 12a, 12b, 22a, 22b are recalled by address generators 13a, 13b, 23a, 23b and transferred to formatting RAMs 14, 24 in response to address generators 15 and 25.

The 44.1-kHz clock pulse is also supplied to a format sync generator 32. This sync generator generates, at every count of five clock pulses, an 8-bit format sync code composed of "11111111" at a rate corresponding to the horizontal sync of a video format. The clock is also applied to a "field" sync code generator 33, which generates a field sync code "10000000" at every count of five clock pulses and generates a burst of three such field sync codes for a duration of 15 clock intervals a series of "00000000" bits during the remainder of each field interval. For application to the NTSC systems, field sync generator 33 counts 736 clock pulses to generate a burst of field sync codes. In PAL or SECAM system applications, field sync generator 33 counts every 881 clock pulses to generate a field sync. The format and field sync codes are applied to formatting RAMs 14 and 24 to be organized in a data structure to be described hereinbelow.

A memory control circuit 34 derives timing signals from clock pulses and controls address generators 13a, 13b, 23a, 23b, 14 and 24 at appropriate times to organize the audio and control program data with format and field sync codes. The operation of the memory circuit 34 will be visuallized with reference to FIGS. 2 and 3.

Figure 2:
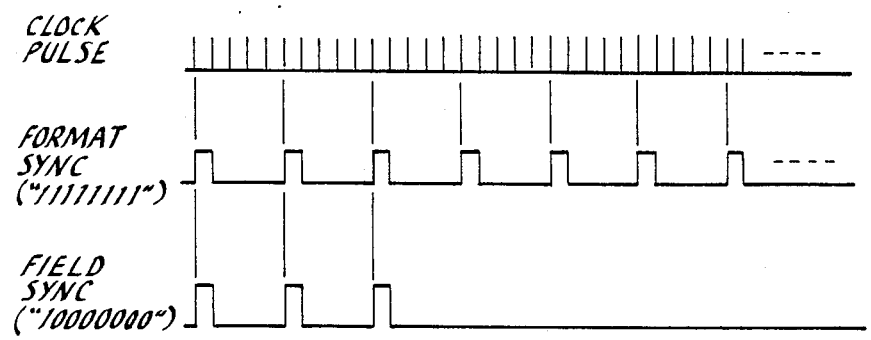
FIG. 2 is a timing diagram showing the relationship between clock pulses, format and field sync codes.

As shown in FIG. 2, format sync generator 32 generates a format sync code ("11111111") at each count of five clock pulses, while field sync generator 33 generates a series of three field sync codes ("10000000") for each field interval in which a total of 736 clock pulses-,exist for NTSC applications. In respohse to a format sync code, memory control circuit 34 enables address generator 15 to store the eight bits of the format sync code respectively into the cell locations of formatting RAM 14 corresponding to the first to eigth rows on the first column. Address generator 25 is also enabled to address the first through eigth rows of the first column of formatting RAM 24 to store the field sync code bits "10000000". At the same time, memory control unit 34 enables address generators 23a and 23b to read control program data bits Pl through P8 from buffer RAM 22a into cell locations of formatting RAM 14 in the ninth through sixteenth rows of the first column and read control program data bits P9 through P16 from the buffer RAM 22b into cell locations of memory 24 in the ninth through the sixteenth rows of the first column.

In response to a subsequent clock pulse memory control unit 34 enables address generators 13a and 13b to read audio program data words CH1-1 and CH2-1 on channels No.1 and No. 2 from buffer RAM 12a into the cell locations of RAM 14 corresponding to the first to sixteenth rows on the second column and read audio program data words CH-9 and CH10-1 on channels No. 9 and No. 10 from buffer RAM 12b into the cell locations of RAM 24 corresponding to the first to sixteenth rows of the second column.

In a similar manner, audio program data words CH3-1 and CH4-1 on channels No. 3 and 4 are stored in the third column of the formatting RAM 14 and data words CH11-1 and CH12-1 on channels No. 11 and 12 are stored in the third column of the formatting RAM 24. Audio program data words CH5-1 and CH6-1 on channels No. 5 and 6 are stored in the fourth column of the formatting RAM 14 and data words CH13-1 and CH14-1 on channels No. 13 and 14 are stored in the fourth column of the formatting RAM 24. Audio program data words CH7-1 and CH8-1 on channels No. 7 and 8 are stored in the fifth column of the formatting RAM 14 and data words CH15-1 and CH16-1 on channels No. 15 and 16 are stored in the fifth column of the formatting RAM 24. At the count of first 5 (five) clock pulses at the beginning of each field interval, the sixteen audio program data words and the sixteen control data bits are organized into a No. 1 "audio" block together with the format and field sync codes.

Subsequent audio blocks No. 2 to No. 3 are organized in response to the occurrence of each format sync code in a manner identical manner to that just described, so that the field sync code "10000000" is stored in each of these blocks. In blocks that follow the No. 3 block, the cell locations of memory 24 specified for field sync codes are filled with "00000000" bits. In NTSC applications, the field sync exists for 15-clock interval and "00000000" bits are stored in audio blocks during 720-clock interval. Control data bits will be decoded during playback into control words for a period of 600-clock interval which exists during said 720-clock interval.

Immediately after the formation of each audio block, all data stored in RAM 14 are sequentially sent on 16-line common bus 16 to a parallel-to-series converter 35 and all all data stored in RAM 24 are sequentially sent on 16-line common bus 26 to the converter 35. This parallel-to-series converter can be implemented as part of a conventional video processor available as DS-900 which rearranges the serial data bits into a video format suitable for conventional video tape recorders. The serially converted data bits are applied to a video tape recorder 36, FIG. 4.

Figure 4:
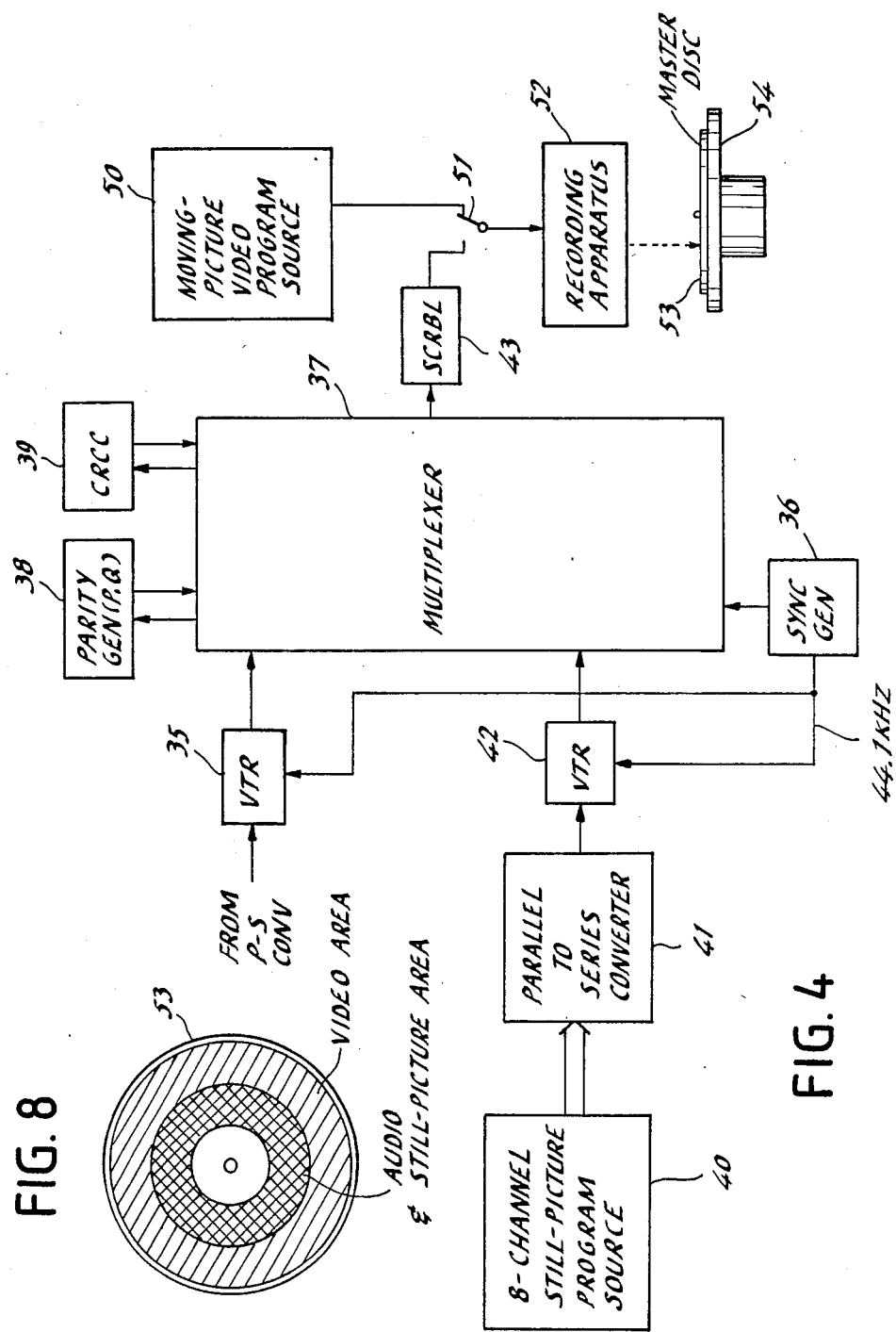
FIG. 4 is a block diagram of a video section of the recording apparatus in which audio and video signals are combined and recorded.

In FIG. 4, an 8-channel still-picture program recorder 40 contains eight channels of still picture program. These still-picture programs are time-division multiplexed so that "field" components of the individual programs occur at 19.2-second intervals.

Figure 5:
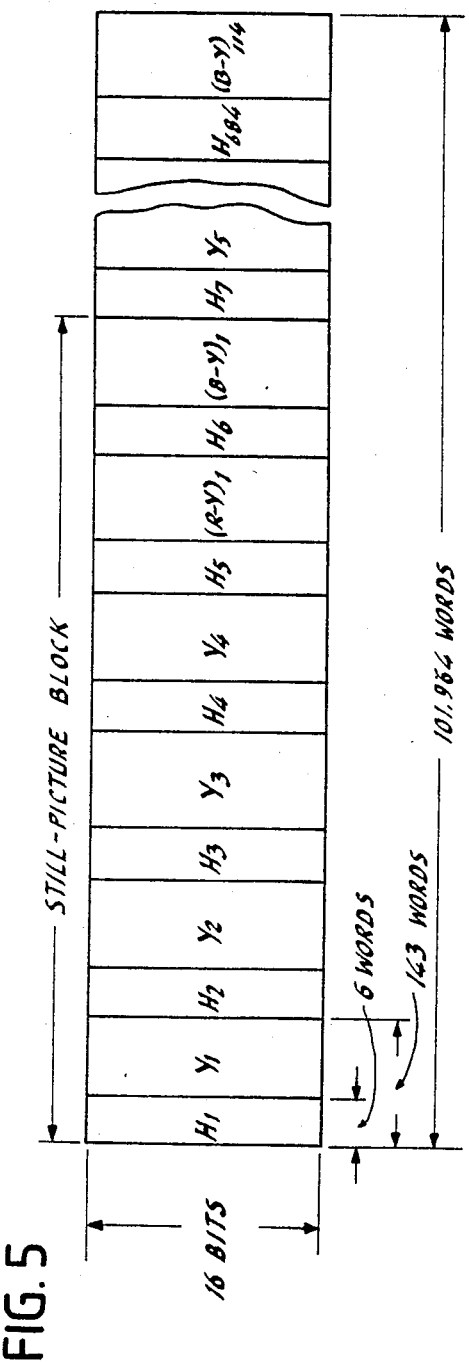
FIG. 5 is an illustration of a data structure of the still-picture video information.

Each still-picture video program is prepared by initially sampling the luminance component of a video signal at 9 MHz and quantizing the samples into 8-bit codes and sampling the color difference components (R-Y, B-Y) at 2.25 MHz and quantizing the color difference samples into 8-bit codes. These digitized luminance and color difference signals are then converted to a digital record of 88.2-kHz luminance and color-difference samples of 8-bit wordlength. For convenience, two pixel data bits are combined to form a 16-bit word. FIG. 5 illustrates a data structure of each still-picture program. One complete "field" of still picture reproduction is organized by 114 successive still-picture data blocks each composed of luminance components $Y_{(1+4i)j}$, $Y_{(2+4i)j}$, $Y_{(3+4i)j}$ and $Y_{(4+4i)j}$, and color-difference components $(R-Y)_j$ and $(B-Y)_j$, where i represents an integer ranging from zero to 114 and j represents an integer ranging from unity to 114.

Each still-picture component Y is composed of a group of 143 words representing the luminance values of a vertical array of 286 pixels arranged on the jth column of the still picture. Color-difference components (R-Y) and (B-Y) are each composed of 143 words representing the color difference values of pixels arranged on the jth column from the left of the still picture. A complete still picture comprises a total of 101,964 words.

Each of the luminance and color-difference components is preceded by a 6-word header which permits playback system to identify the video component that follows. In more detail, 15 higher significant bits of the first word of the header comprise a sync code and the least significant bit of the first word and the whole bits of the second word comprise a mode identification code. The third word of the header comprises a 16-bit address code indicating the memory locations of a 525-line system into which the first 8 bits of the following 143-word still picture information are to be stored, the fourth word of the header comprising a 16-bit address code indicating the memory locations of a 625-line system into which the first 8 bits of the following 143-word still picture information are to be stored. The fifth and sixth words of the header are all set to zero bits for future use.

The No. 1 to No. 8 still-picture programs which are respectively associated with No. 1 (No. 9) to No. 8 (No. 16) audio program sources, are fed to parallel-to-series converter 41 similar in operation to converter 35 and thence to a video tape recorder 42.

Video tape recorders 35 and 42 are synchronized with each other in response to a 44.1-kHz, 8-bit sync generator 36 to play back the recorded material in synchronism and apply the recorded signals to a time-division multiplexer 37. The audio and still-picture video data bits are time-division multiplxed into a series of combined data blocks shown in FIG. 6. Each data block of the time-division multiplexed signal begins with an 8-bit sync code supplied from the clock-rate sync generator 36, followed by a 16-bit word of audio program derived from formatting RAM 14 assigned to a first time slot TS-1 and a 16-bit word of audio program derived from formatting RAM 24 assigned to a second time slot TS-2. To the third and fourth time slots TS-3, TS-4 of the block are assigned two data words of each of the 16-bit still-picture programs. Sixteen-bit words of P- and Q-parity codes are derived from the data bits on time slots TS-1 to TS-4 by a parity bit generator 38 and assigned to the fifth and sixth time slots TS-5 and TS-6. A CRC code (cyclic redundant check code) of 23-bit wordlength are derived from the data and parity bits on time slots TS-1 to TS-6 by a CRCC generator 39 and assigned to the seventh time slot TS-7. The CRC code is followed by an address bit ADR and a user's bit U, completing a block with a total of 130 bits. The 8-bit sync words are generated at a repetition rate of 44.1 kHz, so that each data block is organized in the period of 22.6 microseconds.

Figure 10:
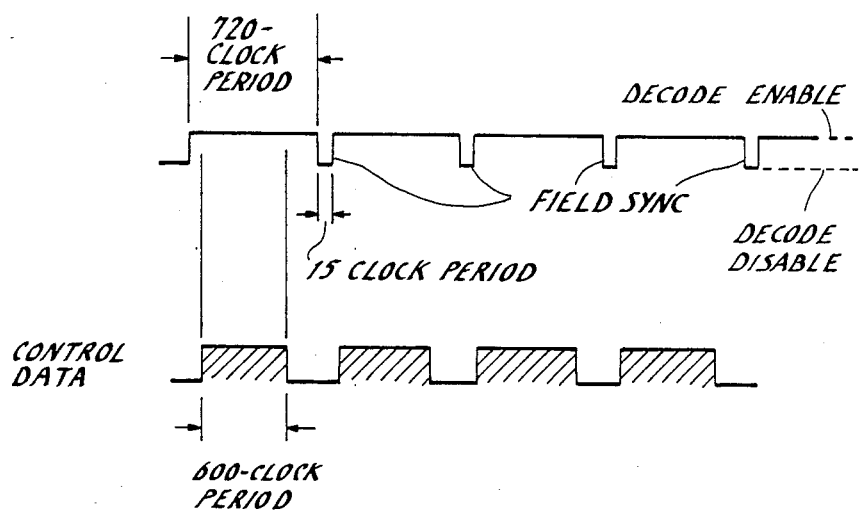
FIG. 10 is a timing diagram illustrating the relationship between field sync codes and computer-control data for NTSC compatible systems.
Figure 6:
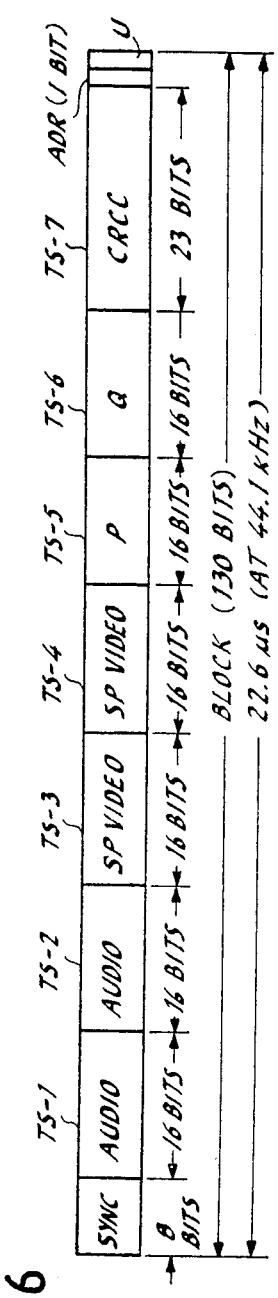
FIG. 6 is an illustration of a data structure of a time-division multiplexed signal.

Since NTSC-system video discs are currently turned at a speed of 889.1 ($=59.94 \times 60/4$) RPM, compatibility with the NTSC system can be ensured by recording a total of 2940 ($=44056 \times 4/59.94$) data blocks of FIG. 6, which is equivalent to four data fields, on each track turn. In that instance the 196-bit address data can be recorded in fifteen different locations on each track turn. As shown in FIG. 10, during a 720-clock period which runs from the 16th to 736th clock pulse, control data bits exist for 600-clock period which runs from the 61st to 661th clock pulse.

Figure 11:
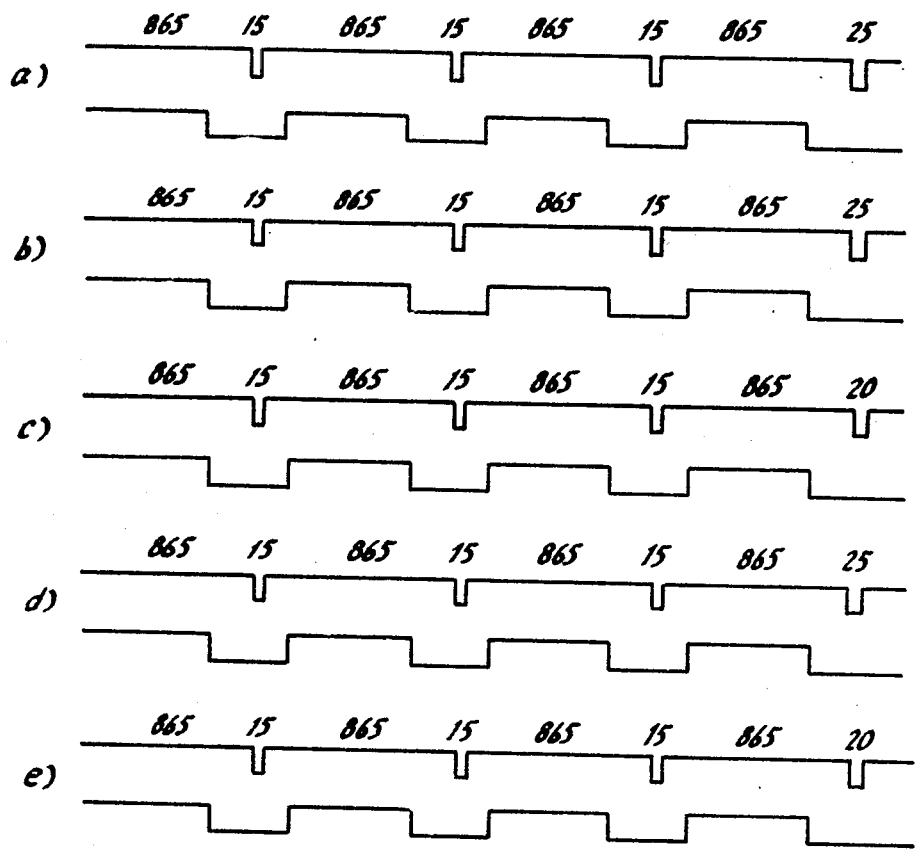
FIG. 11, consisting a-e, is a timing diagram illustrating the relationship between field sync codes and computer-control data for PAL/SECAM compatible systems.

On the other hand, PAL and SECAM system video discs are currently turned at a speed of 750 ($=50 \times 60/4$) RPM. Compatibility with the PAL and SECAM systems is ensured by recording a total of 3528 ($=44100 \times 4/50$) data blocks can be on each track turn, with the 196-bit address data being recorded at 18 different locations on each track turn. While three field sync codes can be uniformly generated at each field interval for the NTSC compatible system, this technique cannot simply apply to the PAL/SECAM compatible system. As shown in FIG. 11, during each of three full turns of disc for every five full turns, three field sync codes ("10000000") are generated in sequence for fifteen clock intervals at each of the first, second and third quarter turns and five field sync codes ("10000000") are generated in sequence during twenty-five clock period at the fourth quarter turn. During each of two full turns of disc for every five full turns, three field sync codes are generated in series at each of the first, second and third quarter turns and four field sync codes are generated in sequence for twenty clock intervals at the fourth quarter turn. In this way, the interval between successive field sync signals can uniformly be spaced at 865-clock intervals.

To establish proper timing for initiating decoding operation on the control data bits, the latter is stored in the No. 13. to No. 133 audio blocks which exist during the period between the 61th to 661st clock pulses of each field interval. Thus, the cell locations P1 to P16 of RAMs 14 and 24 are filled with binary 0's during the period in which the control data bits do not exist.

Figure 7:
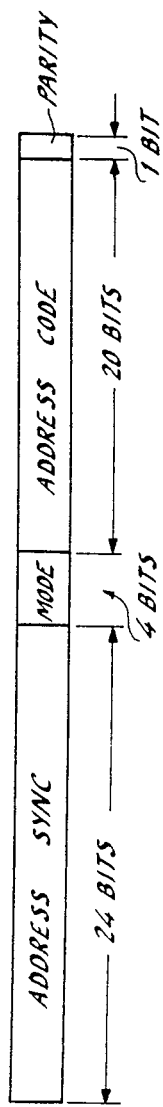
FIG. 7 is an illustration of a format by which address bits stored in each data block of FIG. 6 are organized.

During playback each address bit will be combined with address bits of other data blocks to form 196-bit address data composed of four 49-bit address blocks, one of which is shown in FIG. 7. The 49-bit address block begins with a 24-bit word of address sync whose code format differs from other address sync depending on the address code that follows. A 4-bit word of mode selection code follows the address sync, first two bits of the mode selection code indicating program sources and second two bits indicating normal/stop mode identification. A 20-bit address code and a single-bit parity follow in succession. The address code indicates the amount of time elapsed from the start of recorded material or the identification number of the program being reproduced.

The time-division multiplexed signal is supplied to a scrambler 43 where it is mixed with a pseudo-random bit sequence or maximum length series through an Exclusive OR gate. The scrambled data bits are fed via a switch 51 to a video disc recording apparatus 52 of a known construction where the signal is frequency modulated using modified frequency modulation (MFM) technique to make the output data stream contain a sufficient amount of clock information, and recorded on the surface of a master disc 53 mounted a turntable 54 such that four successive fields of video information are recorded on each track turn. A normal video program is supplied from a conventional video program source 50 to the recording apparatus 52 where it is frequency modulated as in the output of multiplexer 37. The switch 51 is initially positioned to the right to record the normal video progran on an outer area of the disc 53 as marked by parallel-hatching in FIG. 8 and the switch 51 is then moved to the left to record the output of multiplexer in the inner area of the disc as marked by cross-hatching to produce a hybrid of video and audio programs on a single disc record. The frequency modulated signal produces a series of microscopic pits on the surface of the master disc along radially spaced apart grooveless track turns. In practical embodiment, tracking control signals are recorded as microscopic pits along each side of the track in a manner known in the art.

Figure 9:
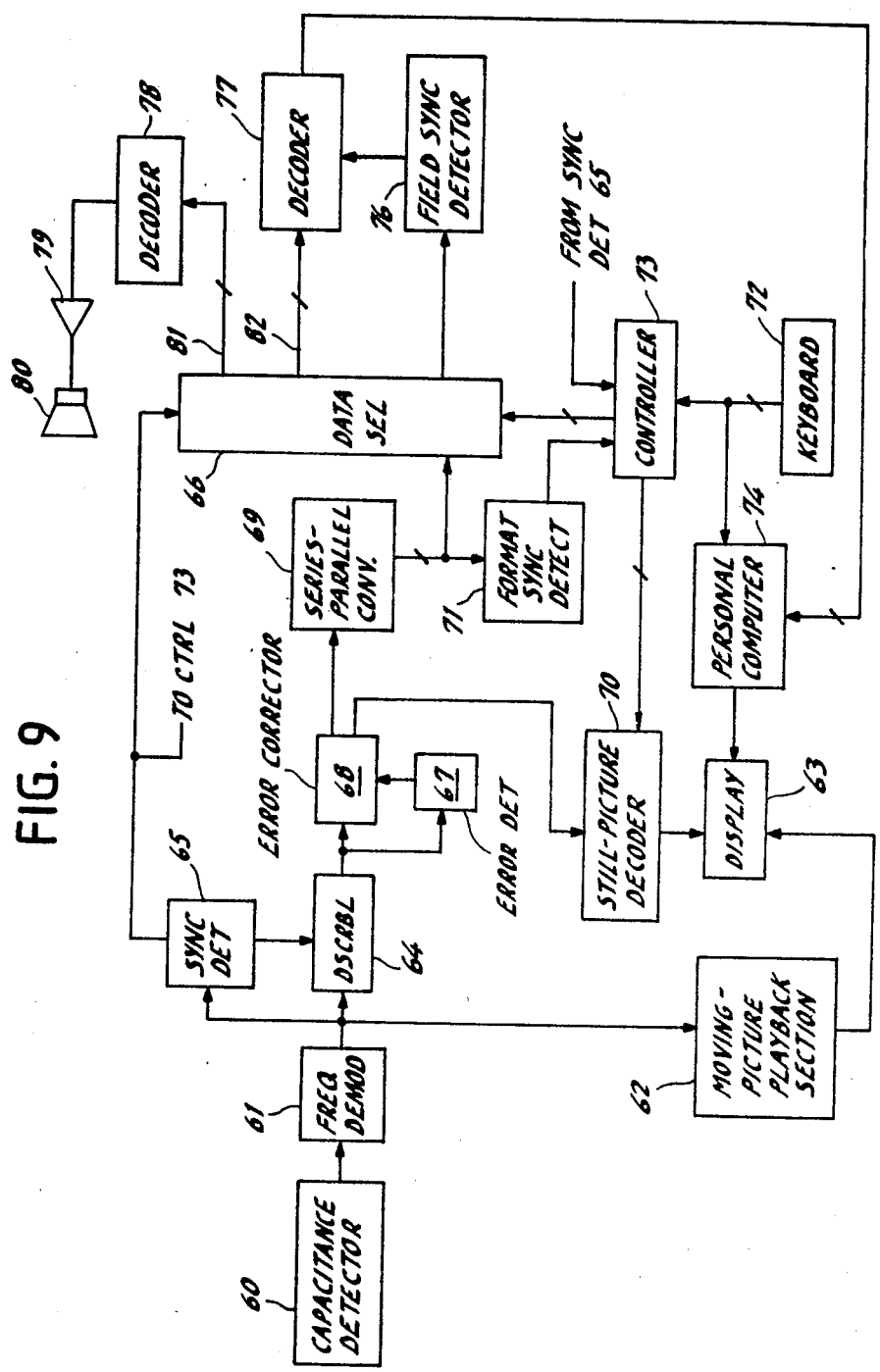
FIG. 9 is a block diagram of a playback apparatus according to the present invention.

FIG. 9 is an illustration of a playback apparatus according to the present invention. A capacitance detector circuit 60 detects capacitive variations on a disc record which is mass-produced from the master disc and feeds its output to a frequency demodulator 61. The normal (moving picture) video signal is decoded by a normal video playback section 62 of known circuitry and fed to a CRT display 63. The audio/still-picture signal is descrambled by a descrambler 64 in a manner inverse to that of the scrambler 43. The 8-bit sync code contained in the scrambled TDM signal is detected by a clock-rate sync detector 65 which generate rectangular pulses at one-half the clock rate. To establish proper timing, the output of sync detector 65 is applied to descrambler 64, data selector 66 and controller 73.

The descrambled data bits are applied to an error detector 67 and an error corrector 68. Using the CRC code contained in the descrambled output, error detector 67 decodes the data bits to detect a word in error and provides an instruction to corrector 68 to rectify the error. The audio data bits on time slots TS-1 and TS-2 are applied in serial form to a series-to-parallel converter 69, while the still-picture data bits on time slots TS-3 and TS-4 are applied to a still-picture decoder 70 of known circuitry a thence to the CRT display 63. The series-to-parallel converter 69 provides conversison of the serial data into a form identical to the two-dimensional format of FIG. 3 and applies the data in parallel form to data selector 66. The audio data bits are further applied to a format sync detector 71 to detect format sync codes.

Program selection command is entered to a keyboard 72 of a personal computer 74. A controller 73 decodes the channel selection command from keyboard 72 and counts the output of sync detector 65 in response to the detection of a format sync code by detector 71 and generates a channel selection code. The channel selection code is applied to data selector 66 and still-picture decoder 70. Controller 73 further provides a field sync extraction signal to data selector 66 to allow it to pass field sync bits to a field sync detector 76. Still-picture decoder 70 includes a memory in which the selected still picture program is retained for a period of 19.2 seconds so that the selected audio and control programs are presented simultaneously with the retained picture.

Figure 3:
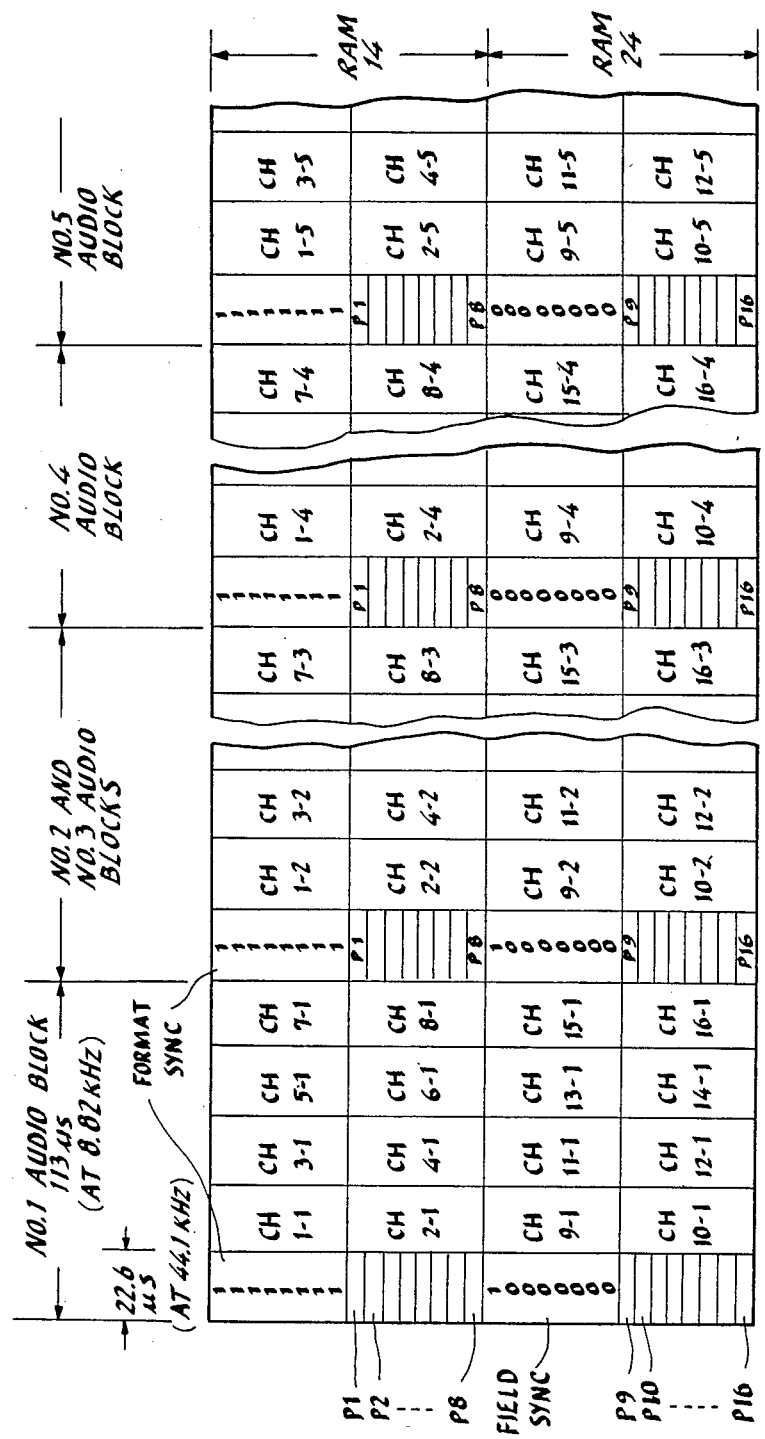
FIG. 3 is an illustration of a data structure by which audio data and computer-control data are organized into a series of blocks.

The audio program of the desired channel appears at terminals 81 which correspond to all the rows of the format of FIG. 3 and the control program of that desired channel appears at terminals 82 which correspond to the 9th to 16th of RAMs 14 and 24. Audio decoder 78 translates the 8-bit audio digital signal into analog form and applies it through amplifier 79 to a loudspeaker 80.

Field sync detector 76 essentially comprises a low-pass filter which integrates the successively arrived binary 1's of the field sync and a comparator which compares the integrated value with a preset value. The comparator generates an output when the detector 76 receives three field sync bits in succession. The output of field sync detector 76 switches from low to high levels in response to the arrival of a valid field sync. Decoder 77 includes an error detection and correction circuit which utilizes the parity and CRC codes inserted by parity/CRCC generators 21a, 21b to detect and correct words in error.

On the other hand, in a PAL/SECAM compatible system, the output of field sync detector 76 remains at high level for a period of 865 clock intervals to permit decoder 77 to decode the control data bits which exist during 600-clock period.

The control data words decoded by decoder 77 are applied to personal computer 74. If the control program is graphic or character data, the computer 74 superimposes graphic symbols or characters on the still picture being displayed, and if the control program is musical notes, the computer controls a musical instrument, not shown, to play music.

What is claimed is:

1. A playback apparatus for disc records in which information is recorded as microscopic pits in radially spaced apart track turns, said information being a sequence of data blocks of multiplexed data words of multi-channel still-picture video signals, data words of multi-channel audio signals and data bits of multi-channel computer-control signals, said audio data words and said computer-control data bits being organized into a sequence of sub-blocks, the volume of information contained in said computer-control data bits of each of said sub-blocks being much smaller than the volume of information contained in said audio data words of each of said sub-blocks, said information further including a first sync code for identifying each data block, a second sync code identifying each sub-block and a third sync code identifying a sequence of said sub-blocks, the apparatus comprising:

means for detecting said recorded information from said disc record to recover said sequence of data blocks;

means for detecting the first sync code from the recovered data blocks and separating binary digits of still-picture data of each channel from binary digits of the audio and computer-control data of each channel;

manual command entry means for generating a channel selection signal in response to a manual command;

means for detecting the second and third sync codes from the separated binary digits of the audio and computer-control data;

data selecting means responsive to the channel selection signal and the detected second sync code for selecting the audio data words of a desired channel and the computer-control data bits of a desired channel from the separated binary digits of the audio and computer-control data of said channels;

video converting means responsive to the selection signal for storing the still-picture data words of a desired channel for a predetermined period and converting the stored data words into an analog video signal for application to a visual display means;

audio converting means for converting the selected audio data words into an analog audio signal for application to an electroacoustic means; and decoding means responsive to the detected third sync code for decoding the computer-control binary digits of the selected channel into computer-control data words for application to a personal computer which is coupled to the display means.

2. A playback apparatus as claimed in claim 1, wherein said disc record includes a storage area in which an analog video signal is recorded, further comprising means for reproducing the recorded analog video signal for application to said visual display means.

3. A playback apparatus as claimed in claim 1, wherein said information is frequency modulated prior to being recorded in said record, further comprising means for frequency demodulating said recovered data blocks.

4. A playback apparatus as claimed in claim 1, wherein said recorded information further includes an error detection code and an error correction code derived from binary digits contained in the data block and appended to each data block, further comprising means responsive to said error detection and correction codes for detecting errors in data words of each data block and correcting the errors.

* * * * *